United States Patent [19]
Cox

[11] 4,338,906
[45] Jul. 13, 1982

[54] FUEL CHARGE PREHEATER

[76] Inventor: Nathan Cox, 1517 40th St., Lubbock, Tex. 79412

[21] Appl. No.: 89,234

[22] Filed: Oct. 29, 1979

[51] Int. Cl.$^3$ .................................................. F02M 31/00
[52] U.S. Cl. ........................................ 123/545; 123/547; 123/548; 261/144
[58] Field of Search ............... 123/557, 545, 548, 547; 261/144, 145; 48/180 H

[56] References Cited

U.S. PATENT DOCUMENTS

| | | | |
|---|---|---|---|
| 1,168,111 | 1/1916 | Pope | 123/557 |
| 1,490,921 | 4/1924 | Godward | 123/548 |
| 4,212,274 | 7/1980 | Quick | 123/545 |

FOREIGN PATENT DOCUMENTS

| | | | |
|---|---|---|---|
| 667472 | 1/1929 | France | 123/545 |
| 102107 | 11/1923 | Switzerland | 123/545 |

*Primary Examiner*—Ronald H. Lazarus
*Attorney, Agent, or Firm*—Bacon & Thomas

[57] ABSTRACT

A fuel preheater for an internal combustion engine directs incoming fuel from inlet manifold (40) against an end wall (22) heated by exhaust gas in conduit (14). The heated mixture is passed through a screen element (30) and traverses a helical path before entry into the intake manifold (50) of the engine. Heating of the mixture to a temperature between 427°–482° C. is disclosed as being advantageous to operation of the engine from the standpoint of noxious emissions.

7 Claims, 4 Drawing Figures

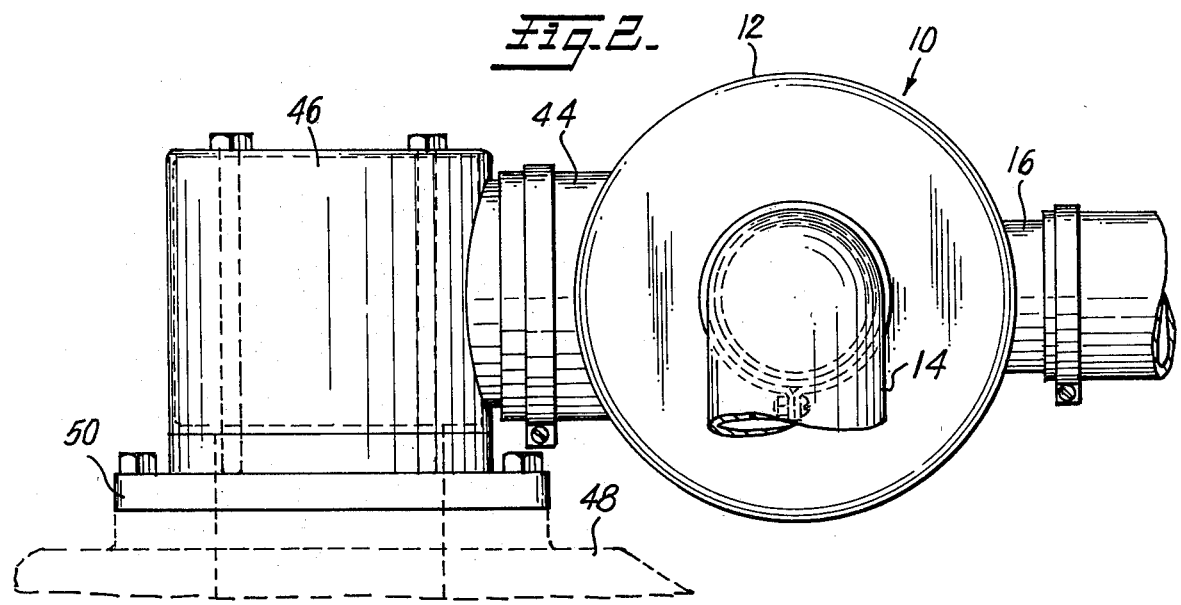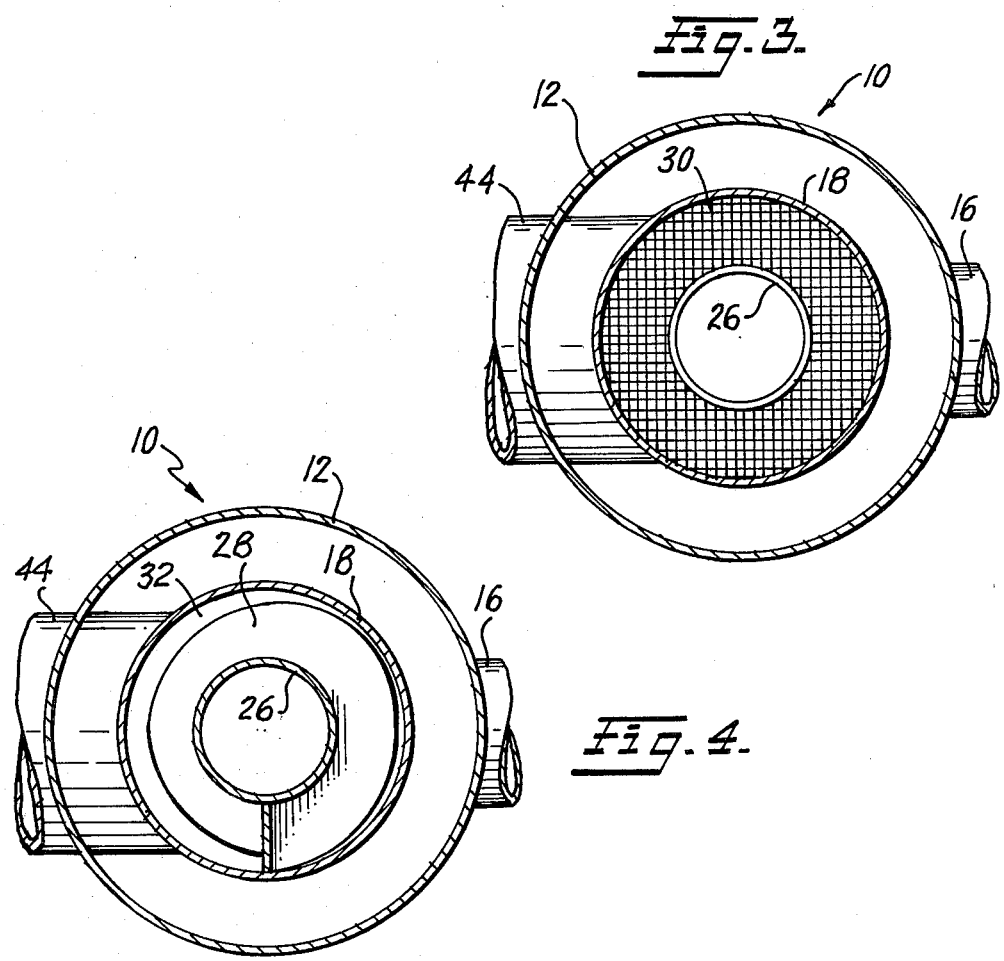

4,338,906

FUEL CHARGE PREHEATER

BACKGROUND OF THE INVENTION

1. Field of the Invention

This invention relates to a preheating device for a combustible air and fuel charge, particularly for a charge aspirating internal combustion engine.

2. Description of the Prior Art

The prior art has long recognized the advantages of preheating a fuel and air charge while it is being drawn into a piston type internal combustion engine to insure vaporization of the liquid fuel portion of the charge. The need for such preheating was particularly keen when heavy oils were used as fuels for such engines, but is was also claimed that engines utilizing more volatile petroleum distillates such as gasoline could benefit from using a preheater for the intake charge.

Examples of early patents disclosing such inventions are seen in British Specification No. 104716, published in 1917; U.S. Pat. No. 1,122,038 issued in 1914; U.S. Pat. No. 1,132,420 issued in 1915; and U.S. Pat. No. 2,090,823 issued in 1937. More recent examples are seen in U.S. Pat. Nos. 3,498,279, 3,645,243 and 3,792,688.

The foregoing patents, as well as numerous other patents and publications, reflect the belief on the part of experts in this field of technology that heating a fuel and air charge while it is aspirated by an engine helps to completely vaporize the liquid fuel supplied to the engine, with consequent improvement in efficiency of the engine. Since combustion efficiency is improved, less fuel is required to satisfy the power demand of the engine. Moreover, since the heat supply for the preheater may be provided by the waste heat from the engine, additional energy input is not necessarily required to operate such preheaters. Many versions of preheater arrangements have thus far been proposed, yet it is apparent from observing modern energy conversion engines that the results obtained from the prior art devices have not met expectations. Many modern engines, of course, are arranged to preheat the charge formed in the carburetor by means of heated intake manifolds that are part of the engine assembly and which are heated in various ways by exhaust gases or engine coolant. The temperature of the incoming fuel/air charge in such installations is raised to some extent, depending upon engine operating conditions. However, the ability of the intake manifold to smoothly deliver a charge of fully vaporized fuel without unduly reducing the density of the charge under all operating conditions is sometimes less than ideal.

The present invention has as its objective the overcoming of problems and shortcomings of prior art charge preheating and vaporizing devices, and proposes a device and process that is believed to provide distinct advantages for modern gasoline powered internal combustion engines.

SUMMARY OF THE INVENTION

This invention is based on the discovery that preheating a fuel and air charge to cause complete vaporization of the liquid fuel and super heating of the charge itself in the range of 427°–482° C. (800°–900° F.) by using a specific configuration of heat exchange conduits drastically reduces the concentration of undesirable emissions from an interanl combustion engine and improves the rate of fuel consumption of the engine. The specific configuration of conduits causes the incoming charge to be directed against heated surfaces maintained between 427° C. and 482° C. and to be deflected and transported away from the heated surface in heat exchange relationship with the incoming charge while it traverses a helical flow path over the incoming charge. The thus heated charge is carried to the intake manifold of the engine where it is converted in the usual manner.

BRIEF DESCRIPTION OF THE DRAWINGS

FIG. 2 is an end view of the preferred embodiment of a charge preheater;

FIG. 3 is a section view taken along line III—III of FIG. 1; and

FIG. 4 is a section view taken along line IV—IV in FIG. 1.

DESCRIPTION OF THE PREFERRED EMBODIMENT

Figure 1:
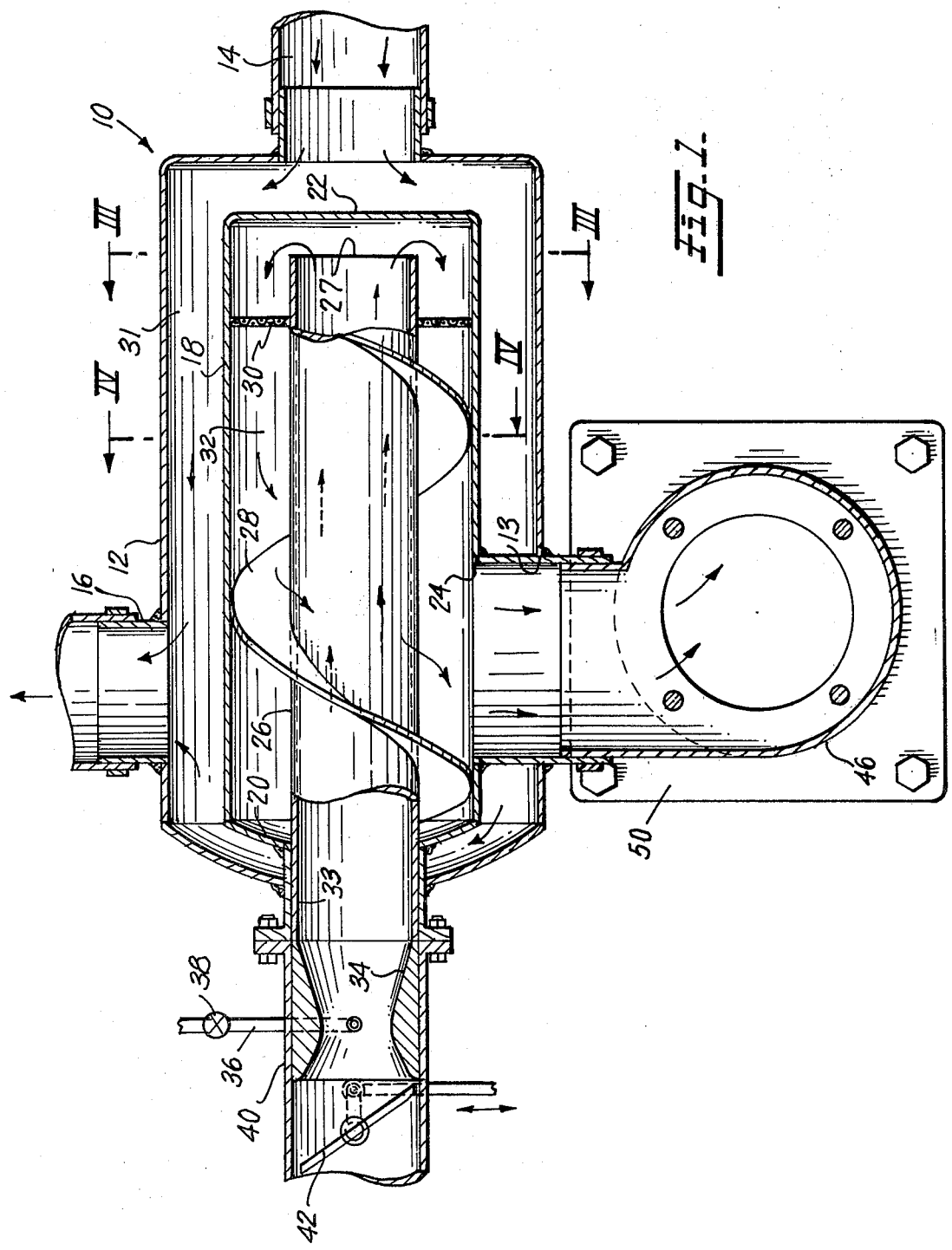
FIG. 1 is a sectional plan view of the charge preheater incorporating this invention.

As shown in FIG. 1, a charge preheater 10 embodying the present invention includes an outer cylindrical shell 12 having an engine exhaust or heated gas inlet 14 and an exhaust or heated gas outlet 16, and a side opening 13, called a charge flow opening. An inner shell 18 is concentrically disposed in the outer shell 12 located adjacent the exhaust gas inlet 14, and a side outlet port 24. A charge inlet conduit 26 extends concentrically through the charge inlet end 20, through inner shell 18 and terminates at a distal end opening 27 near to and facing the closed end wall 22. A helical guide vane 28 extends along the outer side of inlet conduit 26 between the latter and inner shell 18, the pitch of the vane 28 being longer than the diameter of side outlet port 24 to enable its full clearance or traversal around the port opening.

A metal screen or screenlike member 30 extends radially between the inner conduit 26 and the inner shell 18 adjacent the distal end opening 27 of the conduit. The outer shell 12, inner shell 18, conduit 26, guide vane 28 and screen 30 are all secured together in an appropriate manner (e.g., brasing or welding) to prevent their movement relative to one another. The space 31 between inner shell 18 and outer shell 12 form a flow path for exhaust or heated gas between inlet 14 and outlet 16. The space 32 between inlet conduit 26 and inner shell 18 forms a flow path for the heated charge.

The proximal end 33 of inlet conduit 26 communicates with a charge forming means such as a venturi device 34 having a fuel inlet duct 36 communicating with the low pressure region of the venturi, the fuel inlet duct having an appropriate fuel supply control means such as is represented by the fuel control valve 38.

Air supply duct 40 communicates with the proximal end 33 of charge supply duct 26 and with the upstream end of venturi 34. Air control valve 42 controls supply of air through duct 40.

The charge forming arrangement schematically shown as being represented by the venturi 34, fuel and air ducts 36, 40, and valve 38, are intended purely to provide an example of a manner in which the fuel and air charge can be established before its aspiration in an engine through the preheater 10. In actual practice, it may be desirable to use a charge former that enables a suitable air/fuel mixture to be formed while the air supply alone is controlled, or a charge former that enables full supply of air during engine operating conditions above minimal power requirements. It is also desirable in practice to provide some mixture proportion control to enable cold start-up of the engine and to provide suitable idle adjustments. The specific structural details of the charge former shown in FIG. 2 do not themselves constitute the subject matter to be claimed herein. It should be noted, however, that the charge former used with the subject invention can have smaller air flow openings than a conventional carburetor normally used to supply a charge to the same engine.

Side outlet port 24 in inner shell 18 is connected to connector duct 44 that extends to shroud 46 through side opening 13 and bolted directly to engine intake manifold 48 by means of flange 50.

Construction of the preheater includes the use of copper material for at least the inner shell 18, charge inlet conduit 26, screen 30 and guide vane 28. The outer shell 12, the exhaust inlet 14 and the connector duct 44 may be formed of steel, and duct 44 preferably is copper. The closed end 22 of the shell 18 is located close to the discharge area of exhaust gas inlet 14, usually about 1 cm ($\frac{1}{2}$ in.). Exhaust gas inlet 14 is usually connected to the exhaust manifold (not shown) of engine 48 and is provided with a suitable regulator (not shown) for controlling rate of flow or temperature of exhaust gases through inlet 14. The regulator may be thermostatically controlled to insure that closed end area of inner shell 18 is maintained within a desired temperature range. It will be observed that the charge delivered through a charge inlet conduit 26 moves towards the heated end area adjacent end 22 of inner shell 18, strikes the end 22, is reversed to flow through metal screen 30, and through the charge flow path 32 in a whirling, spiral manner. The charge is heated by contact with the heated end wall 22, the screen 30, the walls of the inner shell 18 and the guide vane 28. The screen 30 helps to diffuse and break up the charge, as well as mix the air and fuel intermittently. The flow of the charge is also back over the incoming charge in conduit 26, so that the incoming cold charge begins to be heated by the heated charge in flow path space 32. The overall arrangement is extremely compact and this faciliates installation of the assembly within existing engine compartments of motor vehicles.

In practice, it has been discovered that the temperature range of 427°–482° C. (800°–900° F.) produces optimum results with the preheater embodying the present invention, with 454° C. (850° F.) preferred. On either side of this temperature range, a decrease of engine performance has been observed. Best results seemed to be indicated at 454° C. (850° F.).

The following samples of preheaters embodying the invention were actually constructed and tested.

EXAMPLE 1

A preheater arranged structurally as shown in the attached drawings was constructed having the following dimensions:

| Item | Length | Diameter | Material |
|---|---|---|---|
| outer shell (12) | 25.4 cm (10 in.) | 15.24 cm (6 in.) | steel |
| inner shell (18) | 22.86 cm (9 in.) | 10.16 cm (4 in.) | copper |
| duct (26) | 21.6 cm (8.5 in.) | 3.81 cm (1.5 in.) | copper |
| exhaust inlet (14) | — | 5.08 cm (2.0 in.) | steel |

EXAMPLE 2

A preheater arranged structurally as shown in the drawings was constructed as having the dimensions as Example 1, except duct (26) was 4.45 cm (1.75 in.) in diameter.

EXAMPLE 3

A preheater arranged structurally as shown in the drawings was constructed as having the dimension as Example 1, except duct (26) was 5.08 cm (2 in.) in diameter.

EXAMPLE 4

A charge preheater constructed in accordance with Example 2 was fitted with a side draft carburetor made by S.U. Carburetor Company of Birmingham, England, this carburetor having an outlet port of 3.81 cm (1.5 in.) diameter. The carburetor constituted the only air and fuel charge forming device that was used. The preheater was bolted onto a 1975 Chevrolet 350 CID (5735 cc) engine without other emission controls installed. Hot transient 1974 composite emissions were measured while the engine was operating on regular gasoline and the following emission concentrations were observed, expressed in grams per mile:

HC—1.34
CO—21.66
NOX—1.86
CO2—542.5

The fuel consumption rate observed was 15.28 miles per gallon over the test period. A sticking carburetor plunger was also observed and it is believed that the CO emissions were higher than expected for that reason. The test was conducted in the area of Denver, Colorado, without compensation for the high altitude.

EXAMPLE 5

A preheater constructed in accordance with Example 3 above was constructed and fitted with a side draft carburetor model Stromberg 1.75 CD2 made by Zenith Carburetor Company of Birmingham, England, this carburetor having an outlet port of 4.445 cm (1.75 in.) in diameter. The carburetor was the only device used to form the fuel and air charge. The preheater was bolted to the engine intake manifold of a 1977 Chevrolet 454 CID engine (7440 cc) installed in a threequarter ton Chevrolet truck. No other emission control was installed.

The following emission concentrations were observed at the indicated engine or vehicle speeds, using the fuel as indicated:

| Test Speed | CO | HC | Fuel |
|---|---|---|---|
| idle | .2% | 2.8 ppm* | ethyl |
| 45 mph (72 KmH) | .1% | .7 ppm | ethyl |
| idle | .55% | 1.2 ppm | unleaded |
| 45 mph (72 KmH) | .12% | .6 ppm | unleaded |

*ppm = parts per million

EXAMPLE 6

The preheater installation according to Example 5 was tested after the initial timing of the engine was advanced to 18 degrees BTDC (Before Top Dead Center). The following emission concentrations were observed, using regular gas:

| Test Speed | CO | HC |
|---|---|---|
| idle | .2% | 1.4 ppm |
| 45 mph (72 KmH) | .1% | .7 ppm |

EXAMPLE 7

The preheater installation according to Example 6, with the engine initial timing set to 18 degrees BTDC, was tested on a separate occasion at Denver, Colorado, without other altitude compensation, and the following hot 1974 composite emissions were measured, expressed in grams per mile:

HC—3.53
CO—9.23
NOX—3.16
CO2—644/4
MPG*—13.24

MPG* = miles per gallon rate of fuel comsumption during test.

EXAMPLE 8

A preheater constructed in accordance with Example 2 was installed in a Ford Ranchero having an empty weight of 4,040 pounds (1832.5 kilos) using a Ford 302 CID engine (4950 cc). Using the stock engine and carburetor configuration, fuel consumption was 13 to 14 MPG. With the preheater installed, and using a side draft carburetor of the type described in Example 4, but having a 1.5 in. (3.81 cm) diameter outlet port, fuel consumption dropped to 24-25 MPG over a 100 mile (160 Km) trip.

EXAMPLE 9

A preheater constructed in accordance with Example 3 and fitted with a carburetor described in Example 5 (1.75 in. outlet port) was installed on an Oldsmobile powered by a 455 CID (7456 cc) engine. Fuel consumption was observed between 25 and 29 MPG over various distances.

EXAMPLE 10

A preheater installation similar to Example 3 and fitted with a carburetor described in Example 5 (1.75 in. outlet port) was installed in a 1975 Lincoln Continental manufactured by Ford Motor Company and fitted with a 460 CID 7538 cc engine. Fuel consumption with the stock engine and carburetor was less than 10 MPG. Under similar conditions, fuel consumption with the preheater installed was between 15 and 19 MPG.

From the tests results and observations above, it has been demonstrated that the preheater incorporating the subject invention is effective in reducing the concentration of undesirable emissions produced by internal combustion engines upon which it has been installed and has improved the operating efficiency of the engine as reflected by the improved fuel consumption rates. The invention is believed to be a distinct improvement over prior art devices due to its unique construction and the conditions under which it is operated.

While the invention has been described as having particular application in connection with internal combustion engines, it is believed that the structure and principle disclosed may likewise be applicable in any energy converting system utilizing liquid fuel as a heat source, wherein the liquid fuel is vaporized and mixed with air prior to its combustion.

It should be noted that the source of heat for the closed end wall area, 22 of inner shell 18, as well as along the charge inlet conduit 32, may be any suitable means, including an electrical heater (not shown). An electrical heater (not shown) also could be utilized for start up conditions before the hot exhaust gases became available.

What is claimed is:

1. A preheater for heating a fuel and air charge mixture intended for use in a system that converts the chemical energy of the charge to useful heat energy by combustion comprising:

an outer shell having a heated gas inlet, a heated gas outlet and a charge flow opening;

an inner shell supported within the outer shell in spaced apart relationship for providing a heated gas flow path between the shells;

said inner shell having an open charge inlet end, an opposite closed end located adjacent and facing said heated gas inlet, and a side outlet port adjacent said charge inlet end;

a charge inlet conduit extending within said inner shell and supported in spaced apart relationship relative thereto, said charge inlet conduit extending through said inner shell open inlet and terminating at its distal end opening adjacent said inner shell closed end;

said inner shell and charge inlet conduit being connected together in sealed relationship at the inlet end area of said inner shell so that a charge flow path is provided in the space between said charge inlet conduit and said inner shell, said charge flow path including said side outlet port in said inner shell;

a connector duct connecting said side outlet port to said side opening in said outer shell;

a helical guide vane extending along said charge flow path between said inlet ends of said inner shell and a point near the distal end of said charge inlet conduit, said vane extending along the exterior surface of said charge supply conduit, and in close fitting engagement with the outer and inner surfaces respectively of said charge supply conduit and said inner shell;

whereby charge mixture may be transported through said charge inlet conduit, adjacent said closed end area of said inner shell, and through the charge flow path in a helical path along said vane in a direction parallel to the incoming direction of said charge, and out through said side opening in said outer shell; and further whereby heated gas may be circulated through said heated gas flow path from the closed end of said inner shell to said inlet end thereof.

2. The apparatus as claimed in claim 1, said inner shell, charge inlet conduit and vane being constructed from copper metal.

3. The apparatus as claimed in claim 1, including a porous screen-like member extending between the outer surface of said charge inlet conduit near the distal end of said inner conduit and the inside wall of said outer shell, said screen located between the end of said vane and the distal end of said charge inlet conduit.

4. The apparatus as claimed in claim 1, said outer shell, inner shell and charge inlet conduit being cylindrical in form and concentrically disposed relative to one another.

5. The apparatus as claimed in claim 1, said vane having a pitch greater than the diameter of said outlet port, and arranged to circumvent said port.

6. The apparatus as claimed in claim 4, said exhaust gas inlet and said inlet end of said inner shell being located along the axis of said outer and inner shells.

7. The apparatus as claimed in claim 1, including an internal combustion engine arranged to aspirate said charge, said engine having an exhaust gas manifold, said heated gas inlet being connected to said ehaust gas manifold, said engine further having an intake manifold, said intake manifold being connected to said side opening in said outer shell.

* * * * *